(12) United States Patent
Bendanan et al.

(10) Patent No.: US 12,147,527 B2
(45) Date of Patent: Nov. 19, 2024

(54) CODE INJECTION DETECTION USING SYNTACTIC DEVIATION

(71) Applicant: Microsoft Technology Licensing, LLC, Redmond, WA (US)

(72) Inventors: Haim Saadia Bendanan, Tirat Carmel (IL); Andrey Karpovsky, Kiryat Motzkin (IL); Inbal Argov, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 17/552,317

(22) Filed: Dec. 15, 2021

(65) Prior Publication Data

US 2023/0185899 A1 Jun. 15, 2023

(51) Int. Cl.
*G06F 21/00* (2013.01)
*G06F 21/51* (2013.01)

(52) U.S. Cl.
CPC ........ *G06F 21/51* (2013.01); *G06F 2221/033* (2013.01)

(58) Field of Classification Search
CPC ............... G06F 21/51; G06F 2221/033
See application file for complete search history.

(56) References Cited

U.S. PATENT DOCUMENTS

| | | | |
|---|---|---|---|
| 11,593,477 B1* | 2/2023 | Thimmegowda | G06F 16/252 |
| 2008/0183689 A1* | 7/2008 | Kubota | G06F 16/2471 |
| 2017/0132277 A1* | 5/2017 | Hsiao | G06F 16/2425 |
| 2018/0084007 A1* | 3/2018 | Dinerstein | H04L 63/1466 |
| 2019/0207974 A1 | 7/2019 | Jas et al. | |

FOREIGN PATENT DOCUMENTS

CN 110427754 A 11/2019

OTHER PUBLICATIONS

"International Search Report and Written Opinion Issued in PCT Application No. PCT/US22/049471", Mailed Date: Feb. 23, 2023, 12 Pages. (MS# 410823-WO-PCT).

* cited by examiner

*Primary Examiner* — Ghazal B Shehni
(74) *Attorney, Agent, or Firm* — Workman Nydegger

(57) ABSTRACT

The processing of an incoming query targeted to a data store in a way that early detection of code injections can be achieved. Initial code injections, even if unsuccessful, can be used to adjust the code injections to more successfully perform harmful actions against the data store. Accordingly, early detection can be used to block attackers from experimenting against the data store. The early detection is accomplished by detecting when all or a portion of the query is structured in accordance with a query language, but does not follow the syntax recognized by the underlying data store. This is a good indication that the issuer of the query is performing a blind code injection, not knowing the type of the underlying data store.

20 Claims, 4 Drawing Sheets

CODE INJECTION DETECTION USING SYNTACTIC DEVIATION

BACKGROUND

Some programming languages are used to perform operations on data stores, such as databases. Such programming languages are often termed a "query language". The query engines that operate as the front end of data stores recognize particular query languages. Accordingly, when the data store receives a query that is structured in accordance with a recognized query language, the data store will process the query accordingly.

A common query language is Structured Query Language (or "SQL"). SQL queries may be used in particular to interface with relational databases. SQL can be used to modify database tables and index structures; add, update, or delete rows of data; retrieve subsets of information within the database, and so forth.

Code injection (such as SQL injection) refers to the use of malicious query instructions to perform inappropriate operations within a data store. This takes advantage of the fact that the front end is already authenticated with the data store, and that the front end communicates with the back end in a way that is not visible to the user/attacker. Such inappropriate operations may include maliciously manipulating data or structures, unauthorized accessing of data, and so forth. Code injection often is structured so as to perform operations that the authenticated issuer is not authorized to perform. Code injection is thus considered a hostile attack against the data store.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the processing of an incoming query targeted to a data store. The processing is performed in a way that early detection of code injections can be achieved. Initial code injections, even if unsuccessful, can be used to adjust the future query attempts to more successfully perform harmful actions against the data store. Accordingly, early detection can be used to block attackers from experimenting against the data store, and reverse engineering a successful code injection.

The early detection is accomplished by detecting when all or a portion of the query is structured in accordance with a query language, but does not follow the syntax recognized by the underlying data store. This is a good indication that the issuer of the query is performing a blind code injection, not knowing the type of the underlying data store. After all, code injection tools often do not know the proper syntax permitted by the query engine that will be processing the query. From this, it can be inferred that the issuer does not know the type of the underlying data store, and thus the syntax that is recognized by that underlying data store. This suggests that the issuer is in fact acting maliciously, and injecting code into the query in an attempt to perform improper operations upon the data store. Furthermore, this detection is done early, thereby allowing for more timely responses to the malicious attempts.

In response to detecting receipt of a request, the query processing component determines that the received query has at least a portion that is not structured in accordance with recognized syntax of the underlying data store, but that is structured in accordance with a query language. In response to this determination, the query processing component generates an alert data structure that represents an alert that the received query is suspected to be a code injection attack on the data store. Appropriate action may then be taken using this alert data structure, such as visualizing a corresponding alert to an administrator, at least temporarily blocking further communications from the issuer of the query, and/or perhaps logging the corresponding alert.

Optionally, the query processing engine can also detect whether or not the query portion matches one or more of a plurality of attack structures that are represented in an attack dictionary. Such an attack dictionary may contain well-known attack structures that are often used in code injection, and may be augmented as new attack structures are discovered. This additional protection protects against false positives and negatives when alerting to the presents of a suspected code injection attack.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to the processing of an incoming query targeted to a data store. The processing is performed in a way that early detection of code injections can be achieved. Initial code injections, even if unsuccessful, can be used to adjust the future query attempts to more successfully perform harmful actions against the data store. Accordingly, early detection can be used to block attackers from experimenting against the data store, and reverse engineering a successful code injection.

The early detection is accomplished by detecting when all or a portion of the query is structured in accordance with a query language, but does not follow the syntax recognized by the underlying data store. This is a good indication that the issuer of the query is performing a blind code injection, not knowing the type of the underlying data store. After all, code injection tools often do not know the proper syntax permitted by the query engine that will be processing the query. From this, it can be inferred that the issuer does not know the type of the underlying data store, and thus the syntax that is recognized by that underlying data store. This suggests that the issuer is in fact acting maliciously, and injecting code into the query in an attempt to perform improper operations upon the data store. Furthermore, this detection is done early, thereby allowing for more timely responses to the malicious attempts.

In response to detecting receipt of a request, the query processing component determines that the received query has at least a portion that is not structured in accordance with recognized syntax of the underlying data store, but that is structured in accordance with a query language. In response to this determination, the query processing component generates an alert data structure that represents an alert that the received query is suspected to be a code injection attack on the data store. Appropriate action may then be taken using this alert data structure, such as visualizing a corresponding alert to an administrator, at least temporarily blocking further communications from the issuer of the query, and/or perhaps logging the corresponding alert.

Optionally, the query processing engine can also detect whether or not the query portion matches one or more of a plurality of attack structures that are represented in an attack dictionary. Such an attack dictionary may contain well-known attack structures that are often used in code injection, and may be augmented as new attack structures are discovered. This additional protection protects against false positives and negatives when alerting to the presents of a suspected code injection attack.

Figure 1:
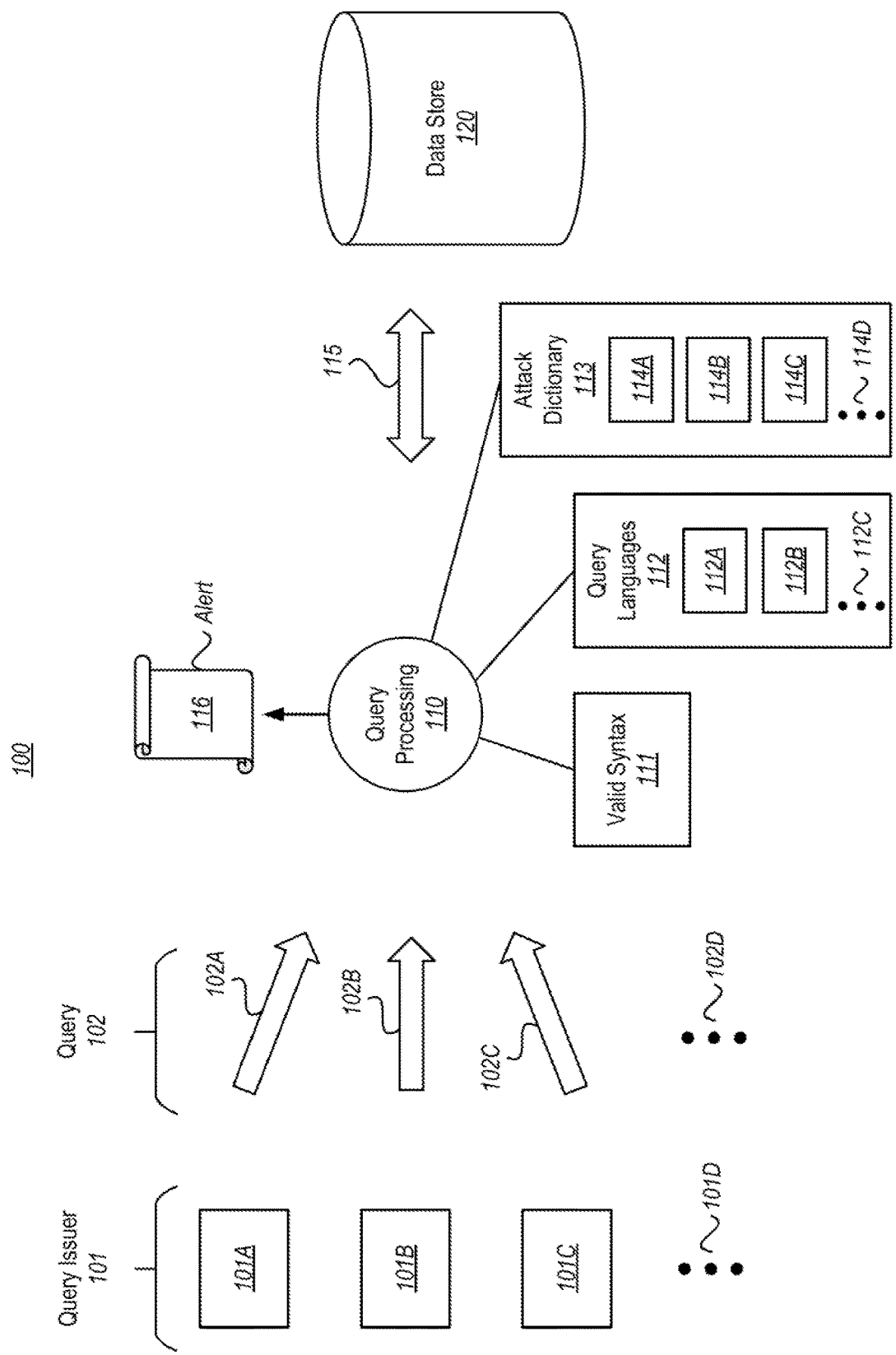
FIG. 1 illustrates an environment in which the principles described herein may be employed, and which includes a query processing component that receives queries to be executed against the data store, and alerts upon detecting a suspected code injection attack.

FIG. 1 illustrates an environment 100 in which the principles described herein may be employed. The environment 100 includes a query processing component 110 that receives queries to be executed against the data store 120. As an example, the data store may be a cloud-based data service, a database, a combination of a cloud-based data service and a database, or any other data store. As an example, the query processing component 120 may be structured as described below for the executable component 406 of FIG. 4. Query processing components that receive and interpret queries for a data store are often termed a "query engine".

The query processing component 110 may receive queries from any of multiple possible query issuers 101. In the illustrated case, the query issuers 101 include three possible query issuers 101A, 101B and 101C. However, the ellipsis 101D represents that the query processing component 110 may receive queries from any number of query issuers. In some cases, there may be innumerable numbers of possible query issuers that may issue queries targeted to the data store 120 that are received by the query processing component 110.

As an example, in the illustrated case, the query issuer 101A sends a query 102A to the query processing component 110, the query issuer 101B sends the query 102B to the query processing component 110, and the query issuer 101C sends the query 102C to the query processing component 110. The queries 102A through 102C may be collectively referred to herein as "queries 102". As represented by the ellipsis 102D, other query issuers (as represented by the ellipsis 101D) may also issue queries to the query processing component 110. The ellipsis 102D also represents that any of the query issuers may issue any number of queries to the query processing component 110.

Each query includes instructions to perform operations on the data store 120. As an example, a query may include instructions to read data, edit data, delete data, and so forth. The term "query" is not used herein to imply that the instruction is limited to reading data. However, the term "query" is understood in the art to represent any instruction to be performed against a data store. In some query languages, the query is structured as a string of characters. The query is typically further structured to conform with syntactic rules of a query language. An example query language is the Structured Query Language (SQL). Other query languages include, but are not limited to, Hyper Text Structured Query Language (HTSQL) language, the Muldis Data (Muldis D) language and Multidimensional Expressions (MDX) language, amongst others. The principles described herein are not limited to any particular query language.

The query processing component 110 recognizes syntax that is valid for use in executing against the data store 120. Such valid syntactic rules are represented by valid syntax 111 in FIG. 1. When the query follows the valid syntax 111, the query processing component performs (as represented by bi-directional arrow 115) the corresponding operations against the data store 120 (after proper authentication if appropriate).

In addition, the query processing component 110 recognizes one or more other query languages as represented by query languages 112, even though those query languages are either completely or partially invalid for executing against the data store 120. That said, the valid syntax 111 may include one or more syntactic rules that are also within one or more of the query languages 112, although that need not be the case. It may also be that the valid syntax 111 includes no syntactic rules that are also included within the one or more query languages 112.

Thus, some or even all of the syntax of each of the query languages 112 are not recognized as valid syntax 111. The reason why the query processing component 110 recognizes such other query languages 112 is so that the query processing component 110 can recognize when all or a portion of an incoming query is invalid syntax for use in execution against the data store 120, but which does conform to a query language. The inventors have recognized that such is a strong early indicator that the issuer of the query is in the initial stages of a blind code injection attack against the data store 120. If the query had invalid syntax for use in execution against the data store 120, but which also does not conform to any query language, that is an indicator that the query was simply mistyped with innocent intent.

In the illustrated case, the query languages 112 recognized by the query processing component 110 are illustrated as including two query languages 112A and 112B. However, the ellipsis 112C represents that the query processing component 110 may recognize any number of other query languages from as few as a single query language to potentially many query languages. In one embodiment, at least one of the query languages 112 is the SQL query language.

Optionally, the query processing component 110 also has access to an attack dictionary 113 that contains entries for a plurality of attack structures. The query processing component 110 may also check the query to see if it includes any of such attack structures. In the illustrated embodiment, the attack dictionary includes three entries 114A through 114C, each representing an attack structure. However, the ellipsis 114D represents that the attack dictionary 113 may include entries for any number of attack structures, and that entries may be added as new attack structures are discovered.

Figure 2:
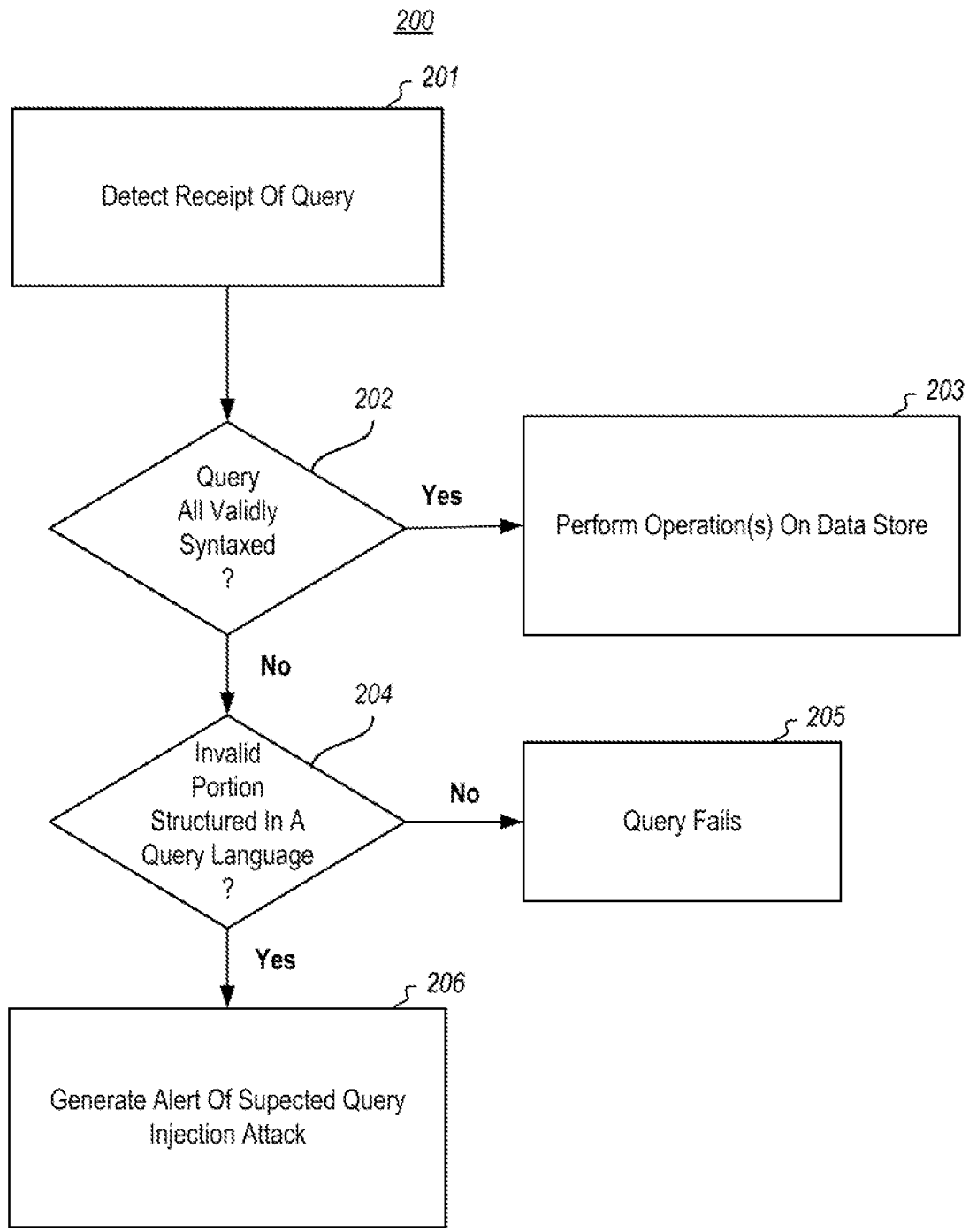
FIG. 2 illustrates a flowchart of a method for a query processing component to process an incoming query targeted to a data store, in accordance with the principles described herein, in which code injection is suspected based on conformity of an invalid query portion with a query language.

FIG. 2 illustrates a flowchart of a method 200 for a query processing component to process an incoming query targeted to a data store, in accordance with the principles described herein. As an example, the method 200 may be performed by the query processing component 110 of FIG. 1 when processing queries directed towards the data store 120. Accordingly, the method 200 of FIG. 2 will now be described with frequent reference to the environment 100 of FIG. 1.

The method 200 is initiated upon detecting receipt of a query (act 201), and may be performed each type an incoming query is detected. Referring to the environment 100 of FIG. 1, suppose that the query processing component detects receipt of the query 102A from the query issuer 101A. This will be referred to herein as the "subject example".

The query processing component then determines whether or not the query is formed in accordance with the valid syntax (decision block 202). If the query is structured in accordance with the valid syntax ("Yes" in decision block 202), the query is executed against the data store 120. This presumes that appropriate authentication is performed on the query issuer and that the query issuer is authorized to perform the operations represented by the query in the valid syntax. For example, in the subject example of FIG. 1, the query processing component evaluates the query 102A. If the query 102A is structured in accordance with the valid syntax 111, the query processing component 110 performs the corresponding operation(s) on the data store 120 (as represented by the arrow 115).

On the other hand, if the query processing component determines that the received query has at least a portion that is not structured in accordance with the recognized valid syntax ("No" in decision block 202), the processing proceeds. In particular, the query processing component determines whether or not the query (and most particularly the portion that is not structured in accordance with the recognized valid syntax) is structured in accordance with a query language (decision block 204). A query portion that does not follow the valid syntax will be referred to herein as an "invalid portion" of the query. If the entirety of the query does not follow the valid syntax, such will also be referred to herein as an "invalid portion" of the query.

If the invalid portion of the query is not structured in accordance with a query language ("No" in decision block 204), then the invalid syntax within the query is most likely inadvertent, and thus innocent. Accordingly, in that case, the query simply fails (act 205) without further escalation. In the subject example and in reference to FIG. 1, suppose that the query 102A includes a portion that does not follow the valid syntax 111 ("No" in decision block 202) and also is does not follow any of the query languages 112 ("No" in decision block 204). In that case, the query processing component 110 would fail the query 102A.

On the other hand, if the invalid portion of the query is structured in accordance with a query language ("Yes" in decision block 204), then an alert data structure is generated that represents an alert that the received query is suspected to be a code injection attack on the data store (act 206). In the subject example and in reference to FIG. 1, suppose that the query 102A includes a portion that does not follow the valid syntax 111 ("No" in decision block 202) but does follow one or more of the query languages 112 ("Yes" in decision block 204). In that case, the query processing component 110 would generate an alert data structure 116.

Referring to FIG. 1, the valid syntax 111 may be a subset of one of the query languages 112. As an example, perhaps the valid syntax 111 includes a subset of the SQL query language 112A, and that query language 112A is the SQL language. This means that the query processing component 110 will recognize some, but not all, of the SQL language. In that case, even if the query portion is perfectly formed SQL, if that query portion includes syntax that is not recognized by the data store 120, then an alert could be generated suspecting that the query is in fact a code injection attempt. On the other hand, the valid syntax 111 might not be syntax from any other of the query languages 112.

The alert data structure may be used to present a visualization of the suspected injection attack to an administrator or other user. The alert data structure may also result in queries coming from the query issuer to be at least temporarily suspended. The alert data structure may also be logged for later analysis.

The following represents an example of a query that includes an invalid portion that complies with a query language, and will now be described by way of an example: {"query": "select c.salesChannelId as SalesChannelId, c.sku as SKU, c.amount as Amount from c where c.salesChannelId=\"UA\" and array_contains([\"t'execmaster..xp_cmdshell 'nslookup www.google.com'--\"], c.sku)", "parameters":[ ]}

In the example, the italicize portion represents a portion of the query that satisfies the syntax of the query engine. However, the underlined portion represents an invalid portion that does not follow the valid syntax of the query engine, and thus cannot be run on the query engine. Nevertheless, the underlined portion does follow an actual query language, which is SQL. Thus, the presence of such a query will result in the method 200 resulting in an alert that the query could be a code injection attack.

In the example of FIG. 2, the determination of whether the query is suspected of being a code injection attack is made based on whether the invalid portion follows a query language. However, other considerations may also be factored into the determination. As an example, the determination may alternatively or in addition be based on whether the query includes an attack structure that is within an attack dictionary. As an example, the presence of the text string "or 'x'='x'" (where x can be anything) is problematic. Such would be included within the attack dictionary along with many other entries.

Figure 3:
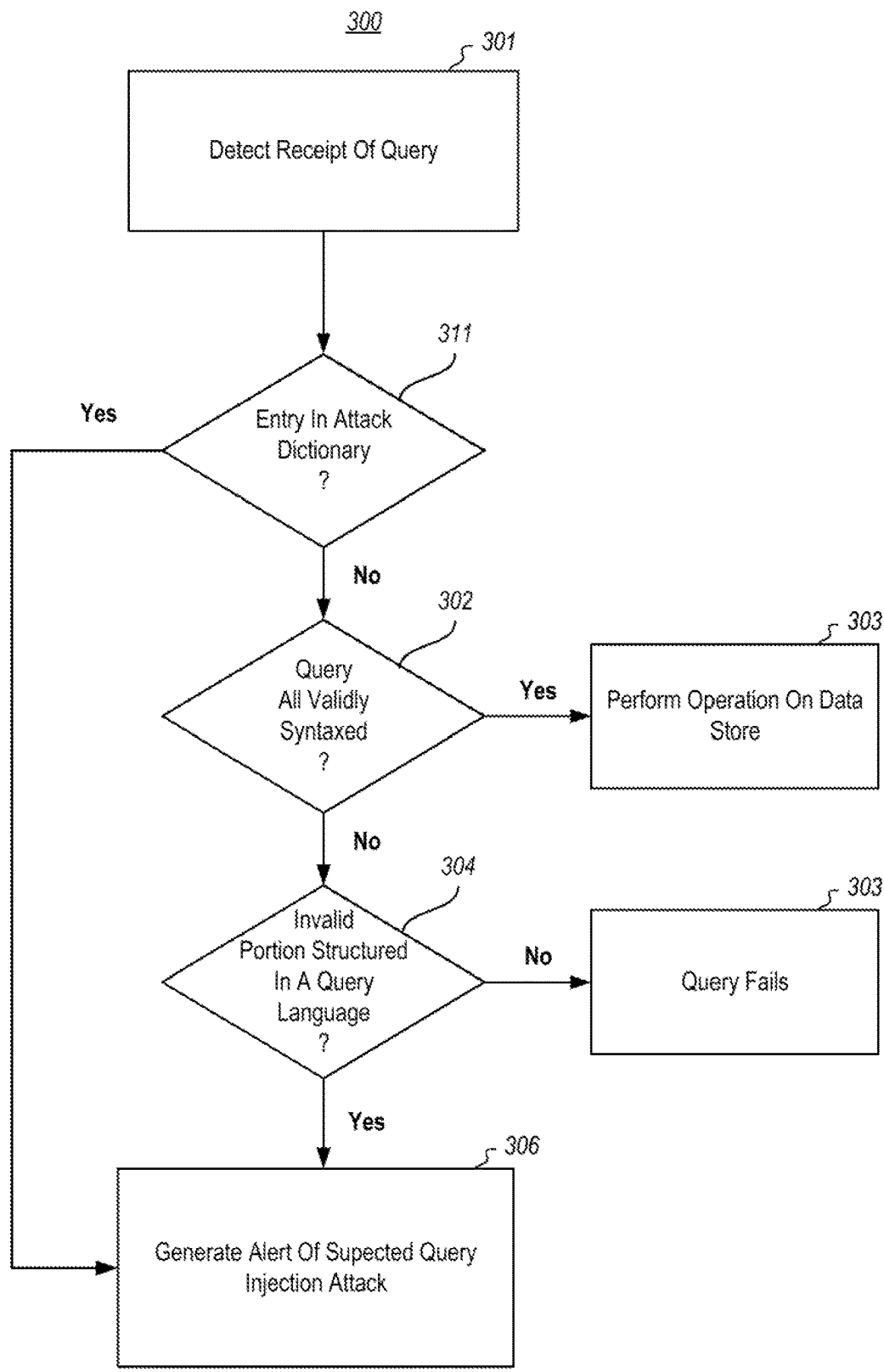
FIG. 3 illustrates a flowchart of a method for a query processing component to process an incoming query targeted to a data store, in accordance with the principles described herein, in which code injection is suspected based on conformity of an invalid query portion with a query language and/or based on a match with an attack dictionary.

FIG. 3 illustrates a flowchart of a method 300 for a query processing component to process an incoming query targeted to a data store, in accordance with the principles described herein. Again, the method 300 may be performed by the query processing component 110 of FIG. 1. Acts 301 through 306 of the method 300 of FIG. 3 may be the same as described above for the acts 201 through 206, respectively, of the method 200 of FIG. 2.

However, the method 300 of FIG. 3 also includes a determination of whether or not the received query has an attack structure that is within the attack dictionary. Referring to FIG. 1, in the subject example, the query processing component 110 may check whether the query 102 includes an attack structure that matches any of the entries 114A, 114B, 114C within the attack dictionary 113.

Accordingly, the query processing component may compare the query against the attack dictionary to determine whether or not the query includes an attack structure that matches one or more of the attack structures represented by entries within the attack dictionary. If so ("Yes" in decision block 311), then the alert data structure may also be generated (act 306). If not "No" in decision block 311), then the method 300 may continue to verify whether or not there is an invalid portion within the query (decision block 302). As an example, perhaps the query includes a HyperText Markup Language (HTML) tag, references to the invocation of tools that should not run against the data store, or well-known structures that attempt to perform improper exfiltration of data. No query should include such structures. Accordingly, such queries would result in the method 300 detecting such attack structures and alerting that the query may be a code injection attempt.

Accordingly, the principles described herein provide an effective way to alert on the presence of possible code injection attempts, and especially can detect such attacks early. This prevents intelligent attackers from reverse engineering the attributes and performance of the data store, and thereby follow-up with more targeted code injections.

Because the principles described herein are performed in the context of a computing system, some introductory discussion of a computing system will be described with respect to FIG. 4. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 4:
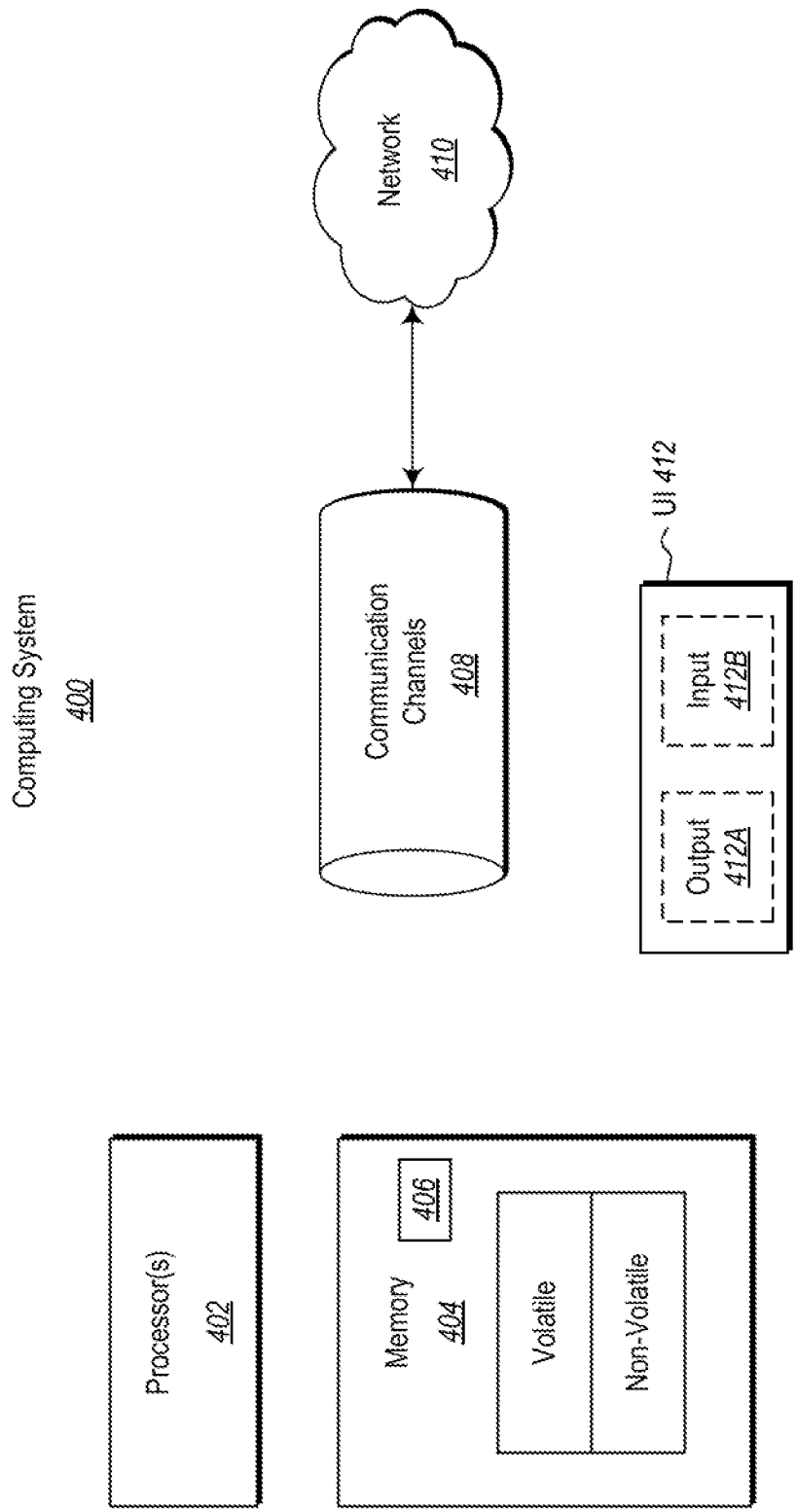
FIG. 4 illustrates an example computing system in which the principles described herein may be employed.

As illustrated in FIG. 4, in its most basic configuration, a computing system 400 includes at least one hardware processing unit 402 and memory 404. The processing unit 402 includes a general-purpose processor. Although not required, the processing unit 402 may also include a field programmable gate array (FPGA), an application specific integrated circuit (ASIC), or any other specialized circuit. In one embodiment, the memory 404 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 400 also has thereon multiple structures often referred to as an "executable component". For instance, the memory 404 of the computing system 400 is illustrated as including executable component 406. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 404 of the computing system 400. Computing system 400 may also contain communication channels 408 that allow the computing system 400 to communicate with other computing systems over, for example, network 410.

While not all computing systems require a user interface, in some embodiments, the computing system 400 includes a user interface system 412 for use in interfacing with a user. The user interface system 412 may include output mechanisms 412A as well as input mechanisms 412B. The principles described herein are not limited to the precise output mechanisms 412A or input mechanisms 412B as such will depend on the nature of the device. However, output mechanisms 412A might include, for instance, speakers, displays, tactile output, virtual or augmented reality, holograms and so forth. Examples of input mechanisms 412B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon computer-executable instructions that are structured such that, when executed by the one or more processors, the computing system would be configured process an incoming query targeted to a data store, the query processing component recognizing syntax that is valid for use in executing queries against the data store, the computing system being configured to process the incoming query by being configured to perform the following upon detecting receipt of the incoming query:
   1) determining whether the received incoming query is structured in a first valid syntax in accordance with a query language, and,
      when the received incoming query is structured in the first valid syntax in accordance with a query language,
   2) determining whether the received incoming query has at least a portion that is structured in the first valid syntax in accordance with the query language but is not structured in a second valid syntax that can be recognized by the data store, the second valid syntax being different than the first valid syntax; and
      in response to determining, when both the syntax of the incoming query is valid for the query language and the at least a portion of the incoming query comprises syntax that is structured in the first valid syntax in accordance with the query language but is not structured in the second valid syntax that can be recognized by the data store, then generating an alert data structure that represents an alert that the received incoming query is suspected to be a code injection attack on the data store.

2. The computing system in accordance with claim 1, the computing system further being configured to perform the following:
   comparing the incoming query against an attack dictionary of a plurality of attack structures;
   determining that incoming query matches one or more of the plurality of attack structures; and
   the generation of the alert data structure also being performed in response to the determination that the incoming query matches one or more entries in the attack dictionary.

3. The computing system in accordance with claim 1, the computing system further being configured to perform the following in accordance with claim 1, the data store being a cloud-based data service.

4. The computing system in accordance with claim 1, the computing system further being configured to perform the following in accordance with claim 1, the data store being a database.

5. The computing system in accordance with claim 1, further comprising the data store.

6. The computing system in accordance with claim 1, the recognized syntax that is valid for use in executing queries against the data store being a subset of syntax of the first query language.

7. The computing system in accordance with claim 1, the query language that the at least a portion of the query is structured in being a different language that includes the second recognized syntax that is valid for use in executing queries against the data store.

8. The computing system in accordance with claim 1, the recognized syntax that is valid for use in executing queries against the data store being a subset of the structured query language (SQL) language, the first valid syntax that the at least a portion of the query is structured in being the SQL language but outside of the subset of the SQL language that is valid for use in executing queries against the data store.

9. The computing system in accordance with claim 1, the computing system further being configured to perform the following:
   using the alert data structure to present a visualization of a suspected code injection attack alert to a user.

10. The computing system in accordance with claim 1, the computing system further being configured to perform the following:
    using the alert data structure to generate an entry in a log.

11. A method for a query processing component to process an incoming query targeted to a data store, the query processing component recognizing syntax that is valid for use in executing queries against the data store, the method comprising:
    detecting receipt of an incoming query;
    1) determining whether the received incoming query is structured in a first valid syntax in accordance with a query language, and,
       when the received incoming query is structured in the first valid syntax in accordance with a query language,
    2) determining whether the received incoming query has at least a portion that is structured in the first valid syntax in accordance with the query language but is not structured in a second valid syntax that can be recognized by the data store, the second valid syntax being different than the first valid syntax; and
    in response to determining, when both the syntax of the incoming query is valid for the query language and the at least a portion of the incoming query comprises syntax that is structured in the first valid syntax in accordance with the query language but is not structured in the second valid syntax that can be recognized by the data store, then generating an alert data structure that represents an alert that the received incoming query is suspected to be a code injection attack on the data store.

12. The method in accordance with claim 11, further comprising:
    comparing the incoming query against an attack dictionary of a plurality of attack structures;
    determining that the incoming query matches one or more of the plurality of attack structures; and
    the generation of the alert data structure also being performed in response to the determination that the incoming query matches one or more entries in the attack dictionary.

13. The method in accordance with claim 11, the data store being a cloud-based data service.

14. The method in accordance with claim 11, the data store being a database.

15. The method in accordance with claim 11, the recognized syntax that is valid for use in executing queries against the data store being a subset of syntax of the first query language.

16. The method in accordance with claim 11, the query language that the at least a portion of the query is structured in being a different language that includes the second recognized syntax that is valid for use in executing queries against the data store.

17. The method in accordance with claim 11, the recognized syntax that is valid for use in executing queries against the data store being a subset of the structured query language (SQL) language, the first valid syntax that the at least a portion of the query is structured in being the SQL language but outside of the subset of the SQL language that is valid for use in executing queries against the data store.

18. The method in accordance with claim 11, further comprising:
using the alert data structure to present a visualization of a suspected code injection attack alert to a user.

19. The method in accordance with claim 11, further comprising:
using the alert data structure to generate an entry in a log.

20. A computer program product comprising one or more computer-readable hardware storage devices having encoded thereon computer-executable instructions that are structured such that, if executed by one or more processors of a computing system, would cause the computing system to be configured to process an incoming query targeted to a data store, the query processing component recognizing syntax that is valid for use in executing queries against the data store, the computing system being configured to process the incoming query by being configured to perform the following upon detecting receipt of the incoming query:

1) determining whether the received incoming query is structured in a first valid syntax in accordance with a query language, and, when the received incoming query is structured in the first valid syntax in accordance with a query language,
2) determining whether the received incoming query has at least a portion that is structured in the first valid syntax in accordance with the query language but is not structured in a second valid syntax that can be recognized by the data store, the second valid syntax being different than the first valid syntax; and
in response to determining, when both the syntax of the incoming query is valid for the query language and the at least a portion of the incoming query comprises syntax that is structured in the first valid syntax in accordance with the query language but is not structured in the second valid syntax that can be recognized by the data store, then generating an alert data structure that represents an alert that the received incoming query is suspected to be a code injection attack on the data store.

* * * * *